US006832267B2

(12) United States Patent
Igarashi

(10) Patent No.: US 6,832,267 B2
(45) Date of Patent: Dec. 14, 2004

(54) TRANSMISSION METHOD, TRANSMISSION SYSTEM, INPUT UNIT, OUTPUT UNIT AND TRANSMISSION CONTROL UNIT

(75) Inventor: Tatsuya Igarashi, Tokyo (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 09/799,169

(22) Filed: Mar. 5, 2001

(65) Prior Publication Data

US 2001/0032276 A1 Oct. 18, 2001

(30) Foreign Application Priority Data

Mar. 6, 2000 (JP) ........................................ 2000-060975

(51) Int. Cl.$^7$ ................................................ G06F 3/00
(52) U.S. Cl. ............................... 710/3; 710/4; 710/33; 710/310; 709/200
(58) Field of Search ............................... 710/3–7, 310, 710/31–35; 709/200–203

(56) References Cited

U.S. PATENT DOCUMENTS

| | | | | |
|---|---|---|---|---|
| 5,265,250 A | * | 11/1993 | Andrade et al. | 709/101 |
| 5,404,463 A | * | 4/1995 | McGarvey | 710/308 |
| 5,539,897 A | * | 7/1996 | Samanta et al. | 711/165 |
| 5,799,158 A | * | 8/1998 | Benayoun et al. | 710/105 |
| 6,115,739 A | * | 9/2000 | Ogawa et al. | 709/215 |
| 6,535,934 B2 | * | 3/2003 | Troxel et al. | 710/31 |

FOREIGN PATENT DOCUMENTS

| | | |
|---|---|---|
| EP | 0 833 485 A1 | 4/1998 |
| EP | 0 872 986 A2 | 10/1998 |
| EP | 0 938 218 A2 | 8/1999 |

OTHER PUBLICATIONS

IEEE Standard for a High Performance Serial Bus, Microprocessor and Microcomputer Standards Committee of the IEEE Computer Society, IEEE Std 1394–1995, XP002268109, Copyright 1995.

* cited by examiner

Primary Examiner—Jeffrey Gaffin
Assistant Examiner—Mike Nguyen
(74) Attorney, Agent, or Firm—Frommer Lawrence & Haug LLP; William S. Frommer; Darren M. Simon

(57) ABSTRACT

To enable setting for transmission through network such as IEEE1394 system with input plugs freely, when transmitting data obtained in an output device connected to a predetermined network to the network from a predetermined output plug of the output device and receiving that data through a predetermined input plug of an input device connected to the network, the output device confirms an address of a buffer for storing data obtained in the input plug of the input device temporarily prior to start of data transmission, according to an address set in a predetermined pointer within a register constituting the input plug and then, transmits data from the output device to the confirmed address.

9 Claims, 18 Drawing Sheets

FIG. 9A

| ctype/response | | |
|---|---|---|
| Command | 0000 | CONTROL |
| | 0001 | STATUS |
| | 0010 | SPECIFIC INQUIRY |
| | 0011 | NOTIFY |
| | 0100 | GENERAL INQUIRY |
| | 0101 | |
| | ~ | (reserved for future specification) |
| | 0111 | |
| Response | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (reserved for future specification) |
| | 1111 | INTERIM |

FIG. 9B

| subunit_type | |
|---|---|
| 00000 | Video monitor |
| ~ | (reserved) |
| 00011 | Disc recorder/Player |
| 00100 | Tape recorder/Player |
| 00101 | Tuner |
| 00111 | Video Camera |
| ~ | (reserved) |
| 11100 | Vendor unique |
| 11101 | reserved |
| 11110 | Subunit type extended to next byte |
| 11111 | Unit* |

FIG. 9C

| opcode:Operation Code | |
|---|---|
| 00h | VENDOR-DEPENDENT |
| 50h | SEARCH MODE |
| 51h | TIMECODE |
| 52h | ATN |
| 60h | OPEN MIC |
| 61h | READ MIC |
| 62h | WRITE MIC |
| C1h | LOAD MEDIUM |
| C2h | RECORD |
| C3h | PLAY |
| C4h | WIND |
| ~ | |

FIG. 14

| Value | Content |
|---|---|
| 00000001 | Type a Segment Buffer |
| 00000010 | Type b Segment Buffer |
| 00000100 | Type c Segment Buffer |
| 00001000 | Type d Segment Buffer |
| ⋮ | ⋮ |
| 10000000 | Type x Segment Buffer |

FIG. 16

| field | CONTROL command frame | ACCEPTED response frame |
|---|---|---|
| subfunction | ALLOCATE(01₁₆) | FIXED(02₁₆) |
| status | not used(FF₁₆) | |
| plug ID | specified plug ID or any available plug(BF₁₆) | specified plug ID or allocated plug ID |
| plug Offset | not used(3FFFFFFFFF₁₆) | Offset address of the plug |
| port ID | consumer port(0₁₆) | ← |
| port bits | not used(11₁₆) | supported value |
| connected node ID | not used(FFFF₁₆) | ← |
| connected plug offset | not used(3FFFFFFFFF₁₆) | ← |
| connected port ID | not used(F₁₆) | ← |
| connected port bits | not used(11₂) | ← |
| connected plug ID | not used(FF₁₆) | ← |
| ex | not exclusive(02) or exclusive(12) | |
| connection count | not used(3F₁₆) | 00₁₆(current value) |
| write interval | not used(F₁₆) | required write interval value |
| retry count | not used(F₁₆) | required retry count value |
| segment type | FF | segment type(consumer) |
| segment sub type | FFFFFF | ← |

FIG. 17

| field | CONTROL command frame ALLOCATE_ATTACH(03₁₆) | ACCEPTED response frame |
|---|---|---|
| subfunction | | |
| status | not used(FF₁₆) | ACTIVE(03₁₆) |
| plug ID | specified plug ID or any available plug(BF₁₆) | specified plug ID or allocated plug ID |
| plug Offset | not used(3FFFFFFFFF₁₆) | Offset address of the plug |
| port ID | specified port ID or any available port(F₁₆) | specified port ID or allocated port ID |
| port bits | not used(1₁₂) | supported value |
| connected node ID | specified node ID to be connected (consumer) | ↓ |
| connected plug offset | offset address of the specified plug to be connected(consumer) | ↓ |
| connected port ID | consumer port(01₆) | ↓ |
| connected port bits | supported value from consumer plug | ↓ |
| connected plug ID | plug ID of consumer | ↓ |
| ex | not exclusive(02) or exclusive(12) | ↓ |
| connection count | not used(3F₁₆) | ↓ |
| write interval | retrieved value from the consumer | ↓ |
| retry count | retrieved value from the consumer | ↓ |
| segment type | segment type(consumer) | segment type(consumer and producer) |
| segment sub type | FFFFFF | ↓ |

FIG. 18

| field | CONTROL command frame | ACCEPTED response frame |
|---|---|---|
| subfunction | ALLOCATE(02₁₆) | |
| status | not used(FF₁₆) | ACTIVE(03₁₆) |
| plug ID | allocated plug ID | ↓ |
| plug Offset | offset address of the plug | ↓ |
| port ID | consumer port(01₆) | ↓ |
| port bits | supported value | ↓ |
| connected node ID | specified node ID to be connected (producer) | ↓ |
| connected plug offset | offset address of the specified plug to be connected(producer) | ↓ |
| connected port ID | port ID of the producer port | ↓ |
| connected port bits | supported value from producer plug | ↓ |
| connected plug ID | plug ID of producer | ↓ |
| ex | not exclusive(02) or exclusive(12) | |
| connection count | not used(3F₁₆) | 01₁₆ |
| write interval | not used(F₁₆) | required write interval value |
| retry count | not used(F₁₆) | required retry count value |
| segment type | segment type(consumer and producer) | ↓ |
| segment sub type | FFFFFF | ↓ |

TRANSMISSION METHOD, TRANSMISSION SYSTEM, INPUT UNIT, OUTPUT UNIT AND TRANSMISSION CONTROL UNIT

BACKGROUND OF THE INVENTION

1. Field of the Invention

The present invention relates to a transmission method and transmission system preferably used for connecting a plurality of units through, for example, IEEE1394 system bus line for carrying out data transmission among those units, and an input unit, an output unit and transmission control unit necessary for building up the same transmission system.

2. Description of the Related Art

AV apparatuses capable of transmitting information from one to the other through a network using IEEE1394 system serial data bus have been developed. For transmitting data through this bus, isochronous transmission mode used for real-time transmission of relatively large volume animation data, audio data and the like and asynchronous transmission mode used for transmitting still image, text data, control command and the like are prepared. A band dedicated for each mode is used for transmission and transmission in both modes can coexist on a single bus.

If an example realized by transmitting data among plural devices connected through such bus is picked up, for example, it is possible to connect a video signal source such as a video camera and digital still camera to a printer unit through the bus, so that the still image outputted from the video signal source can be printed through a printer unit. Transmission of the still image data for such print is carried out in the asynchronous transmission mode. When data transmission is carried out in the asynchronous transmission mode, a unit on the side of data transmission (an output device) is called a producer and a unit on the side of data reception (an input device) is called a consumer. Further, a transmission control unit for controlling data transmission between the producer and the consumer is called a controller. The producer or consumer may sometimes act as the controller at the same time.

In case where audio unit or video unit is connected to the IEEE1394 system serial data bus so as to transmit data among the units, control command transmission system called AV/C command (AV/C Command Transaction Set) can be applied. The detail of this command may be found in Standard "AV/C Digital Interface Command Set General Specification" (Version 3.0, Apr. 15, 1998), 1394 Trade Association.

Upon transmission of data in the form of serial data such as IEEE1394 system data, data input processing and output processing at a bus connecting portion of each unit are complicated and expansion of the function is limited. That is, in case of the IEEE1394 system, for example, a plug is set up in an input portion of a unit connected to the bus and a register for controlling that plug is provided so as to carry out various settings for the plug by means of the register.

FIG. 1 is a diagram showing an example of the structure of a plug control register used when transmitting data in the IEEE1394 type asynchronous transmission mode. This register is formed of hierarchical structure and as shown at the left end, bus address data is classified to nodes which are units to be connected to the bus. Each node data contains node offset data which are data about plugs to be used in data transmission with that node. As data of each plug, an area for storing data of port address for use in the plug and an area used as a segment buffer for storing data received by the plug temporarily are prepared. As the port address data, data of a port address of a transmission mate is stored and data of iAPR, which is an asynchronous input plug and data of oAPR, which is asynchronous output plug are stored. Data of oAPR, which is an output plug, can store data from plural output plugs at the same time to carry out multi-cast processing in which data from plural transmission mates are inputted at the same time.

The area used as a segment buffer is an area prepared for only unit used as consumer (input device). Direct memory access (DMA) processing for transmitting and storing data supplied from the producer (output device) into this buffer in the unit of data called segment is carried out and the data stored in this segment buffer is transmitted to a data processing portion inside the consumer.

In this case, as shown in FIG. 1, a segment buffer is provided in an area following the port address. Here, there is produced a problem that area which can be prepared as the segment buffer is limited. If the area is limited, expansion of the structure of the segment buffer is also limited in future. If the structure of the segment buffer in the input plug is limited, limitation occurs in data transmission system, so that high level data transmission cannot be achieved.

An object of the present invention is to enable setting for transmission through network such as IEEE1394 system with the input plugs freely.

SUMMARY OF THE INVENTION

According to the present invention, when transmitting data obtained in an output device connected to a predetermined network to the network from a predetermined output plug of the output device and receiving the data by a predetermined input plug connected to the network, prior to start of transmission of the data, the output device confirms an address of buffer for storing data obtained in the input plug of the input device temporarily with reference to address set in a predetermined pointer within a register composing the input plug, and transmits data from the output device to the confirmed address.

According to the present invention, by confirming an address set in a pointer within a register and then, transmitting data directly to a buffer at that address, the output device is capable of transmitting data to the buffer set in arbitrary area of the input device.

BRIEF DESCRIPTION OF THE DRAWINGS

FIG. 9 is an explanatory diagram showing an example of data structure according to an embodiment of the present invention;

FIG. 14 is an explanatory diagram showing an example of segment type according to an embodiment of the present invention;

FIG. 16 is an explanatory diagram showing an example of data structure of allocate command and response according to an embodiment of the present invention;

FIG. 17 is an explanatory diagram showing an example of data structure of allocate attach command and response according to an embodiment of the present invention;

FIG. 18 is an explanatory diagram showing an example of data structure of attach command and response according to an embodiment of the present invention.

DESCRIPTION OF THE PREFERRED EMBODIMENTS

Hereinafter, an embodiment of the present invention will be described with reference to FIGS. 2–19.

Figure 1:
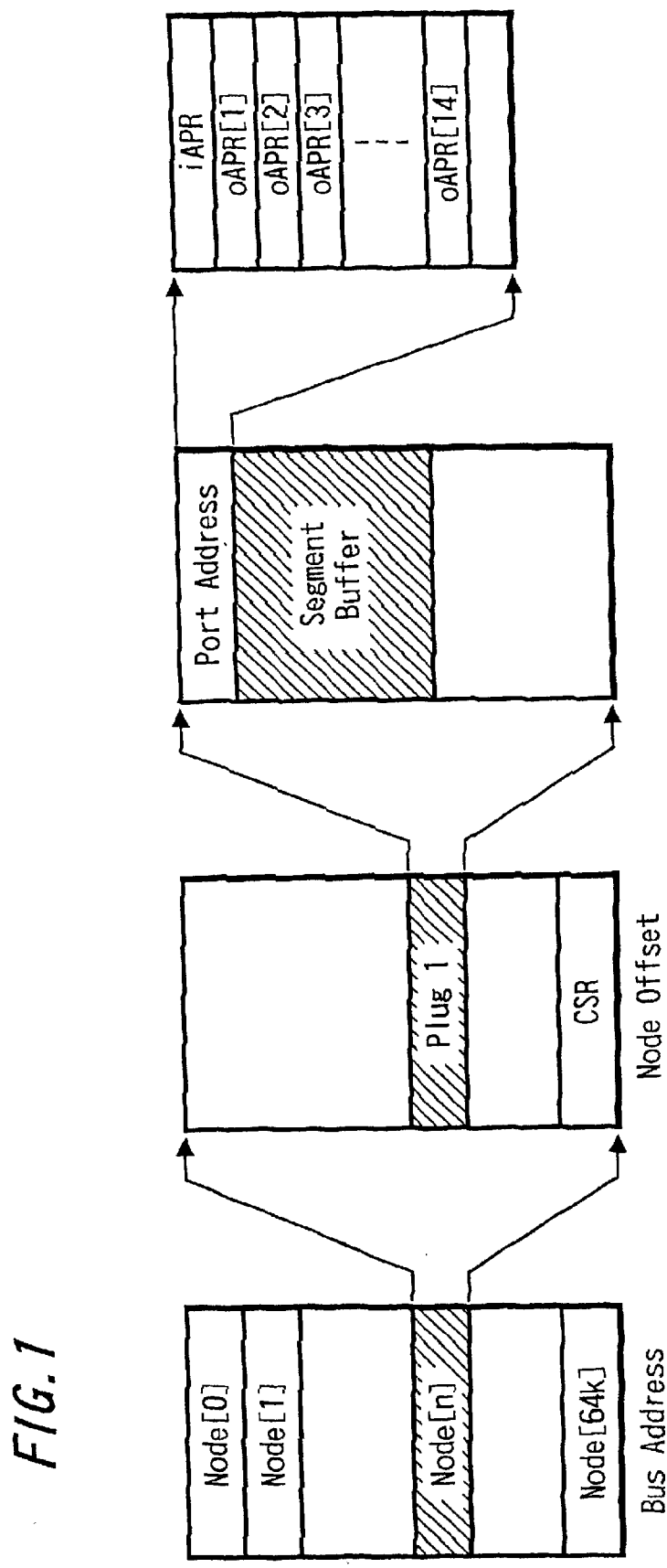
FIG. 1 is an explanatory diagram showing an example of the structure of a conventional plug control register for asynchronous connection.
Figure 2:
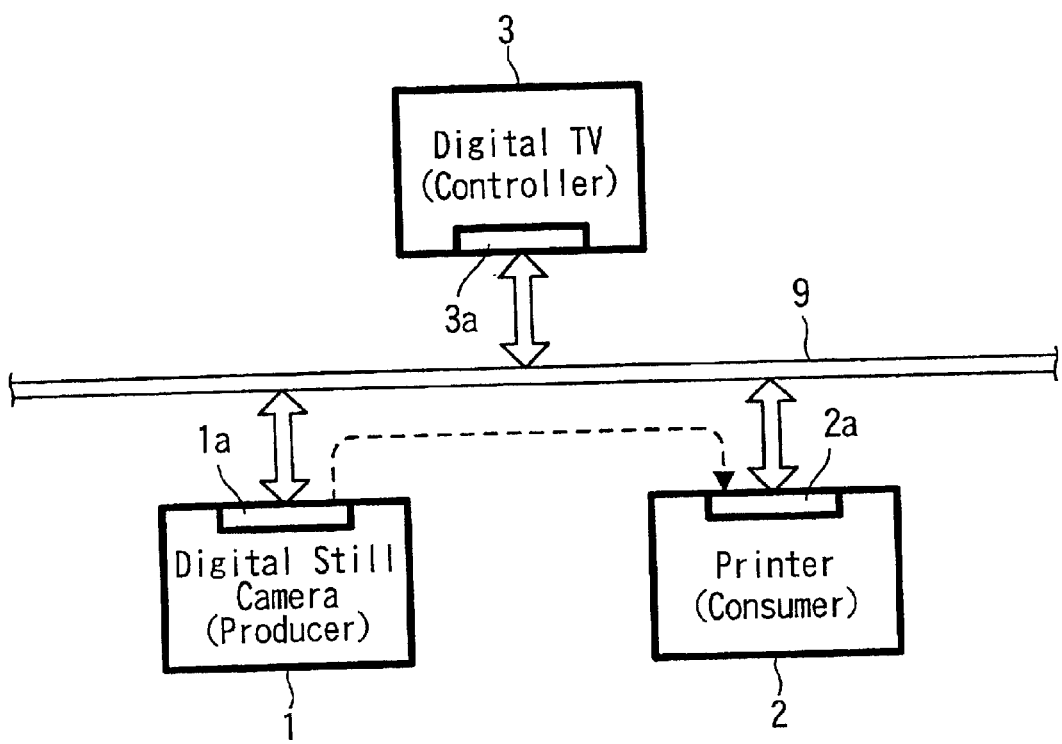
FIG. 2 is a block diagram showing an example of the entire structure of a system according to an embodiment of the present invention.

FIG. 2 is a block diagram showing a connecting structure of a transmission system according to an embodiment of the present invention. In this example, a plurality of units 1, 2, 3 each having a terminal, which can be connected to a bus line 9 specified by the IEEE1394 interface system, are connected to each other through the bus 9. The unit 1–3 prepared are a digital still camera 1 capable of memorizing still image data (or animation data) fetched in by picture taking action into a prepared memory medium, a printer 2 capable of printing out the still image data (or image data in a frame or a field in animation data) on paper and a digital TV unit 3 capable of receiving digital broadcasting and displaying images.

At least one of the units 1–3 connected to the bus 9 has a function as a controller for controlling communication on the bus 9. Here, the digital TV unit 3 is set so as to function as the controller. In the following description, a unit for transmitting data to the bus 9 is sometimes called a producer and a unit for receiving data is sometimes called a consumer. In this example, an example of transmission in case where the digital still camera 1 is a producer while the printer 2 is a consumer will be described.

Figure 3:
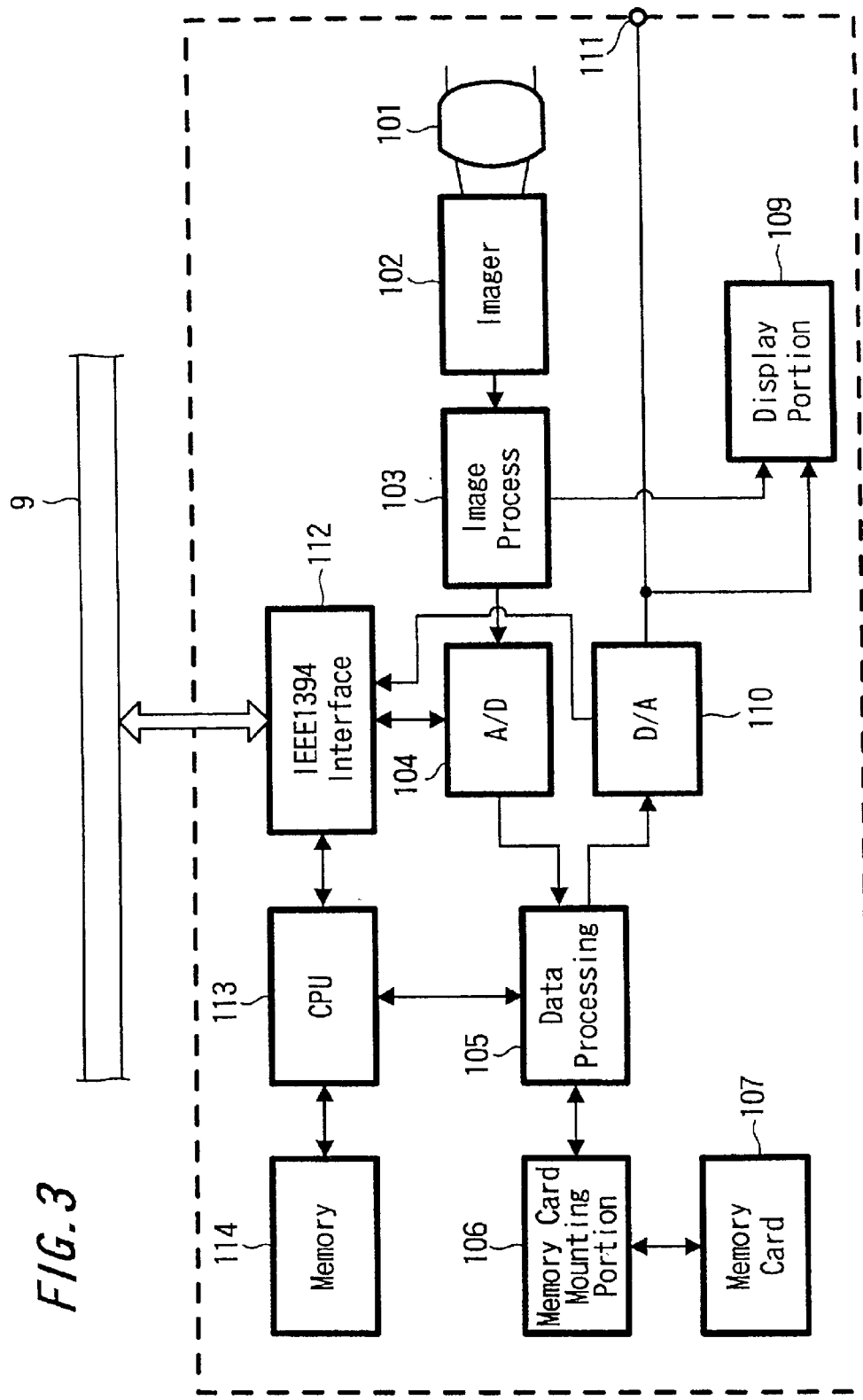
FIG. 3 is a block diagram showing an example of the structure of a digital still camera according to an embodiment of the present invention.

FIG. 3 shows the structure of the digital still camera 1. The digital still camera 1 is a recording/reproducing apparatus capable of memorizing an image signal obtained by picture taking in a memory medium as still image data of a specified method (for example, DV method) and reading the memorized still image data.

Figure 4:
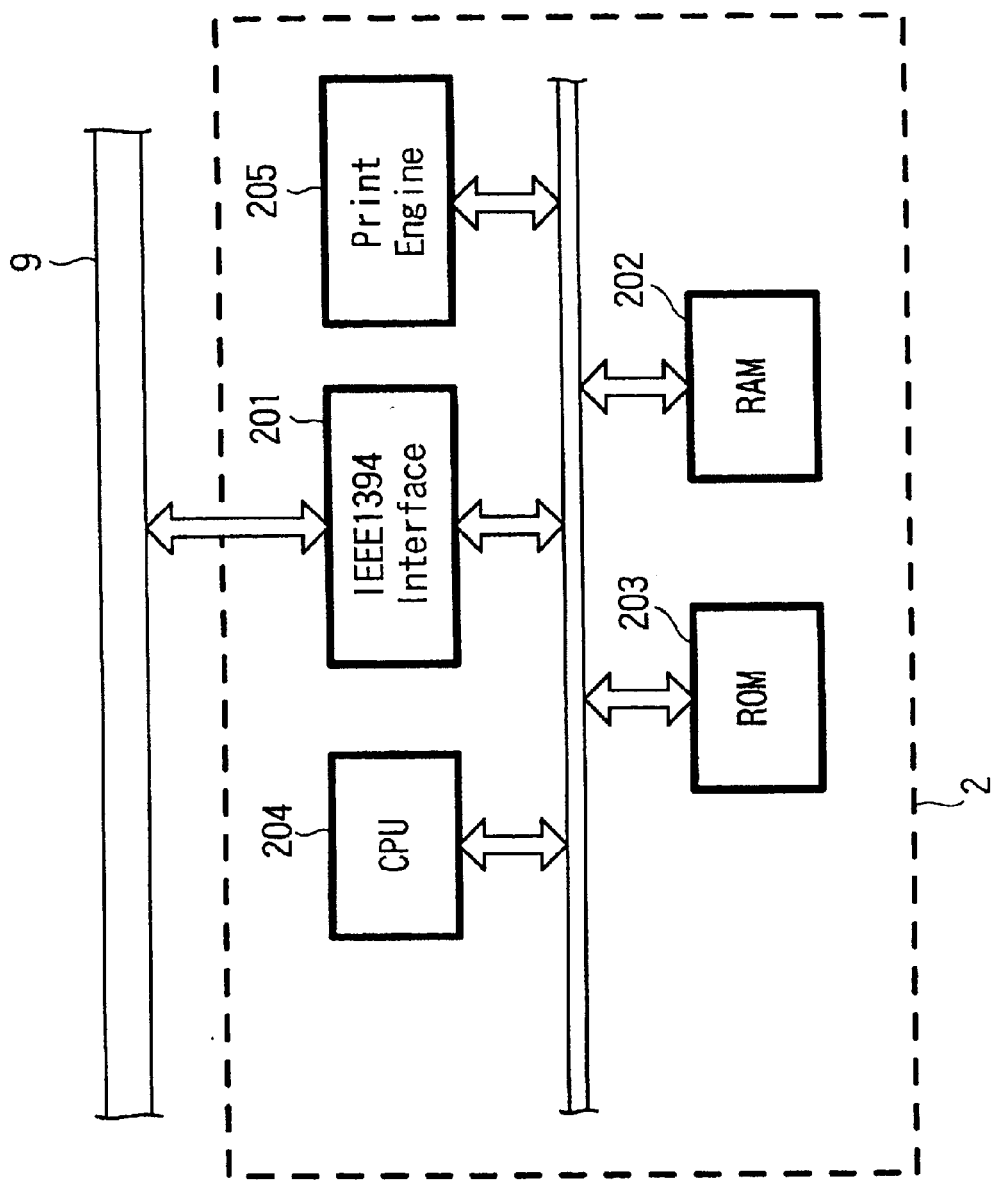
FIG. 4 is a block diagram showing an example of the structure of a printer according to an embodiment of the present invention.

As shown in FIG. 4, image light focused on an image pickup face of an imager 102 through an optical system 101 is converted to an electric image pickup signal and the image pickup signal outputted from the imager 102 is supplied to an image processing portion 103. The image processing portion 103 processes a supplied image pickup signal and supplies the processed signal to a data processing circuit 105 through an analog/digital converter 104. The data processing circuit 105 processes it to still image data based on a specified format and memorizes the obtained still image data in a memory card 107 loaded on a memory card mounting portion 106. This memory card 107 incorporates a semiconductor memory having a specified capacity in a stick-like resin package.

It is permissible to read out still image data memorized in the memory card 107 to the data processing circuit 105, supply the still image data to the digital/analog converter 110, convert it to analog video signal of a specified format and then output it from an output terminal 111. At the time of taking picture or readout of memory data, video image can be displayed on a display portion 109, which is a monitor provided on the still camera 1.

Further, still image data supplied to the analog/digital converter 104 or digital/analog converter 110 can be supplied to the IEEE1394 interface portion 112 so that it can be transmitted to a connected bus 9 as digital video data.

Taking-picture action and readout action in the circuit are carried out by control by a central processing unit (CPU) 113. Transmission of data from the IEEE1394 interface portion 112 to the bus 9 and reception of data by the interface 112 from the bus 9 are carried out by control of the CPU 113. A memory 114 for storing data necessary for control is connected to the CPU 113.

FIG. 4 shows the structure of the printer 2. The printer 2 of this example has a structure containing an IEEE1394 interface portion 201 so as to enable data transmitted through the bus 9 to be printed out. This printer 2 comprises a central processing unit (CPU) 204, a RAM 202 for storing printing data temporarily, a ROM 203 for storing data necessary for printing control and a print engine 205 for executing printing action, and these components are connected through an internal bus.

Figure 5:
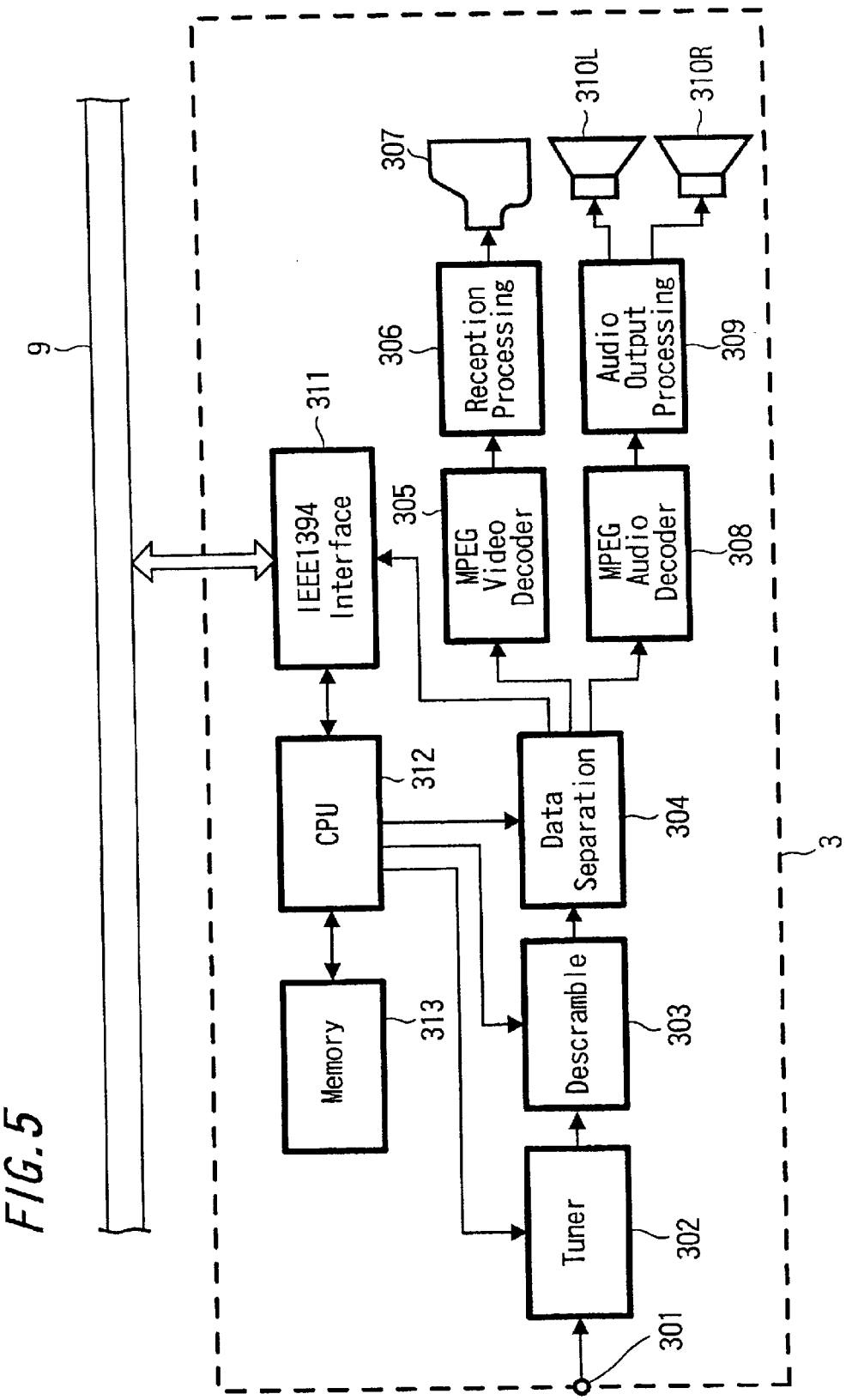
FIG. 5 is a block diagram showing an example of the structure of a digital TV unit according to an embodiment of the present invention.

FIG. 5 shows the structure of a digital TV unit 3. The digital TV unit 3 contains an input terminal 301 to which antenna or cable TV signal line is connected, and receives and processes a signal obtained by a terminal 301 through a turner 302 so as to receive broadcasting wave of a specified channel. The signal received by the turner 302 is subjected to processing for releasing scramble made in broadcasting data by a descramble circuit 303. The descrambled data is supplied to a data separating portion 304 and a desired data is extracted from data multiplexed in a channel.

Video data separated by the data separating portion 304 is supplied to a MPEG video decoder 305 and after decoding processing based on the MPEG system is carried out, it is supplied to a reception processing portion 306, which carries out processing for displaying video image on a display means 307 such as a cathode ray tube. Audio data separated by the data separating portion 304 is supplied to an MPEG audio decoder 308. After decoding processing based on the MPEG system is carried out, it is supplied to an audio output processing portion 309, so as to carry out processing for outputting audio (voice) from speakers 310L, 310R incorporated (or attached outside) in the TV unit.

The TV unit 3 of this example is provided with an IEEE1394 interface portion 311, so that received video data and audio data based on the MPEG system can be transmitted to the connected bus 9. If other data broadcasting channel is received, the received data can be transmitted from the IEEE1394 interface portion 311 to the bus 9.

The receiving action and transmitting action to the bus 9 are executed by control of a central processing unit (CPU) 312. Transmission of data from the IEEE1394 interface portion 311 to the bus 9 and reception of data from the bus 9 by the interface portion 311 are carried out by control by the CPU 312. A memory 313 for memorizing data necessary for control is connected to the CPU 312.

The TV unit 3 of this example functions as a controller on the network composed of the bus 9, and the CPU 312 is so constructed as to execute the function of the controller.

Figure 6:
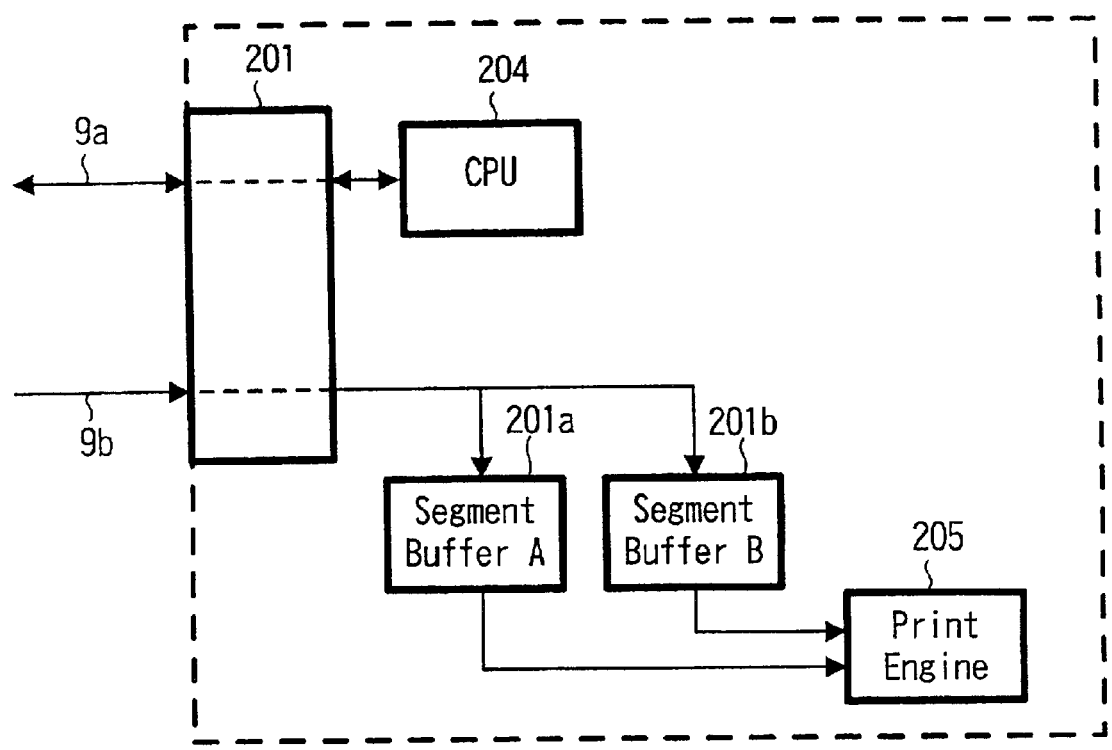
FIG. 6 is a block diagram showing an example of the structure of a consumer device (printer) as viewed from transmission processing according to an embodiment of the present invention.

In case of data transmission in an asynchronous transmission mode based on the IEEE1394 system among respective units 1, 2, 3 connected to the bus 9, it can be considered that a transmission structure for flow control data necessary for transmission control, a structure (in case of a producer) for transmission of output data or a structure (in case of a consumer) for receiving input data are provided. FIG. 6 shows an example of the structure of the printer 2, which is an example of the consumer device as viewed from standpoint of transmission processing. Data to be transmitted through the bus 9 includes flow control data 9a necessary for control and segment data 9b which is data (still image data) to be transmitted actually. The segment data 9a is data to be transmitted in the unit of segment, which is a unit capable of being transmitted at isochronous transmission mode.

The flow control data 9a is directly sent to or received from the CPU 204 through the interface portion 201. Segment data 9b obtained by the interface portion 201 is transmitted directly to segment buffers 201a, 201b by processing called direct memory access (DMA) and then, sent from the segment buffers 201a, 201b to a data processing portion such as a print engine 205. The segment buffers 201a, 201b are set in a specified area within a register forming an input plug in the interface portion 201 and different from a RAM 502 in the printer shown in FIG. 3. Although FIG. 5 is an example having two segment buffers, there is only one segment buffer in some case while there are more segment buffers in some case. The structure of the segment buffer will be described later.

Figure 7:
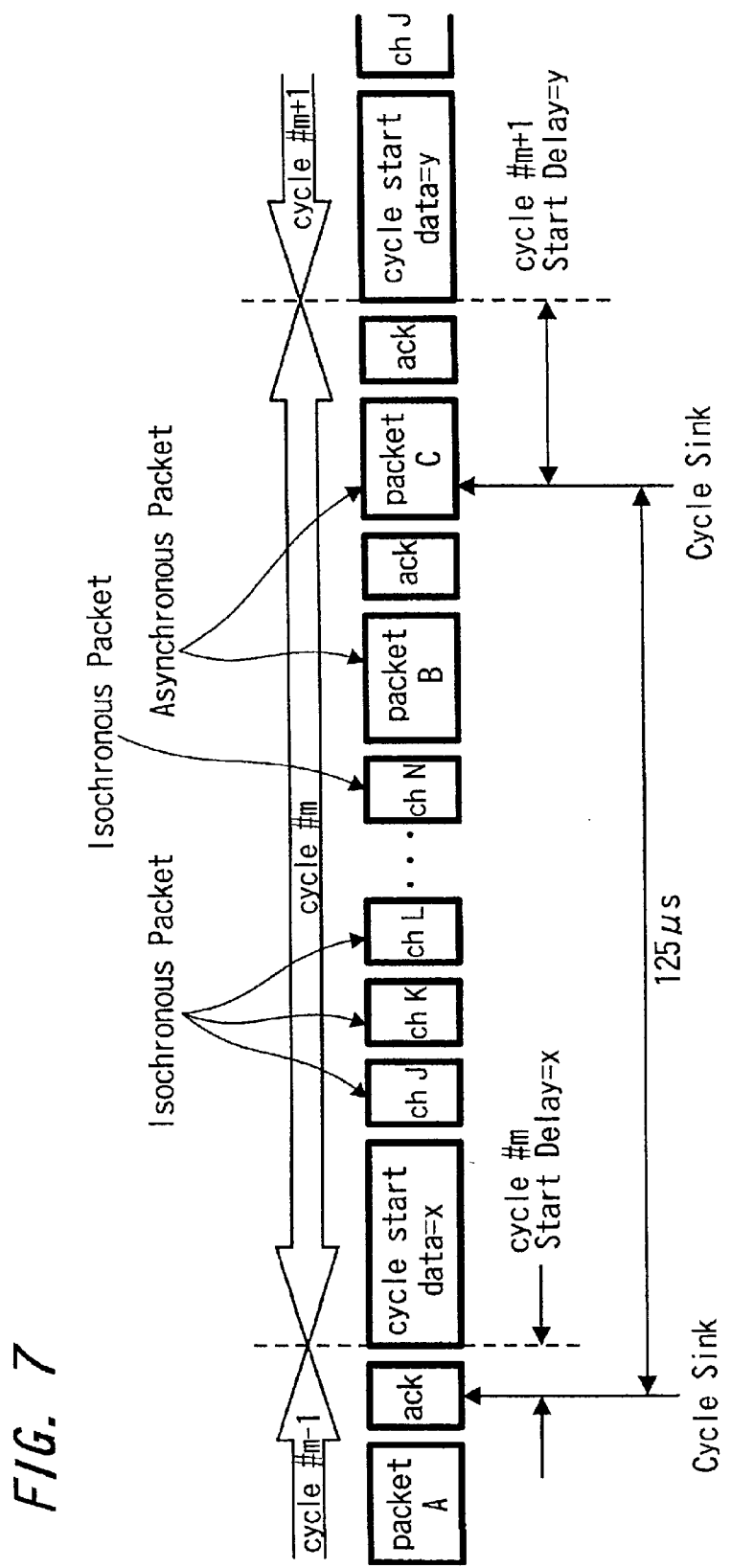
FIG. 7 is an explanatory diagram showing an example of a transmission state according to an embodiment of the present invention.

Data transmission condition through the bus 9 based on the IEEE1394 system, to which the above-described units are connected, will be described. FIG. 7 is a diagram showing the cycle structure of data transmission by a unit connected through the IEEE1394. In the IEEE1394, data is divided into packets, which are transmitted by time division control based on the cycle of 125 $\mu$S long. This cycle is created by a cycle start signal supplied from a node (any unit connected to the bus) having a cycle master function. Isochronous packet secures a band (which is called band although it is time unit) necessary for transmission from a head of all cycles. Therefore, in the isochronous transmission, data transmission in a specific time is ensured. However, there is no system for protection if a transmission error is generated, so that the data is lost. If as a result of arbitration, a node securing the bus uses acknowledge and retry in asynchronous transmission for transmitting an asynchronous packet at a time not used for isochronous transmission of each cycle, secure transmission is ensured, however transmission timing is not made constant.

For a predetermined node (unit) to carry out isochronous transmission, that node must correspond to isochronous function. Further, at least one node corresponding to isochronous function must have a cycle master function. Further, at least one node connected to the IEEE1394 serial bus must have a function of the isochronous resource manager. A unit having the function of the isochronous resource manager corresponds to the above described controller.

The system of this example is capable of controlling each unit and judging a status by using AV/C command specified as a command for controlling a unit connected through the IEEE1394 serial bus. Data for use in this AV/C command will be described below.

Figure 8:
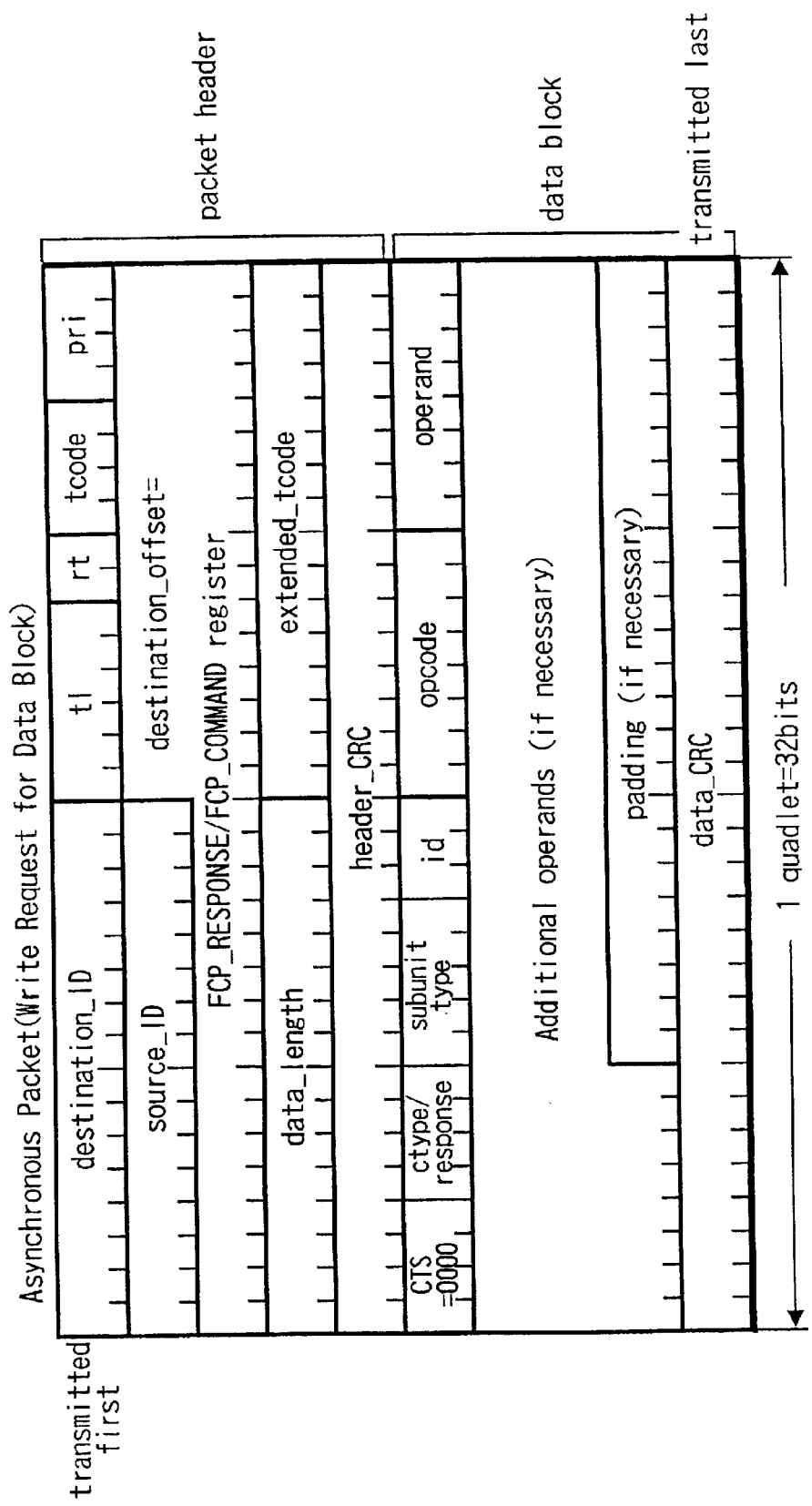
FIG. 8 is an explanatory diagram showing an example of data in transmission packet according to an embodiment of the present invention.

FIG. 8 shows a data structure of a packet to be transmitted at asynchronous transmission mode of the AV/C command. The AV/C command is a command set for controlling an AV unit, and CTS (command set ID) is "0000". AV/C command frame and response frame are exchanged between nodes. A response to the command is specified to be carried out in 100 ms in order to protect the bus and AV units from being loaded. As shown in FIG. 8, asynchronous packet data is constructed of 32 bits (1 quadlet) in a horizontal direction. An upper portion of the same figure indicates a header portion of the packet and a lower portion thereof indicates data block. destination ID (destination ID) indicates a destination.

CTS indicates ID of a command set and in case of the AV/C command set, CTS is "0000". ctype/response (command type/response) field indicates a functional classification of command in case where the packet is command and indicates a processing result of command in case where the packet is a response.

The command is largely defined in four types, that is, (1) command CONTROL for controlling the function from the outside, (2) command STATUS for inquiring for condition from the outside, (3) command GENERAL INQUIRY (absence/presence of opcode support) and SPECIFIC INQUIRY (absence/presence of opcode and operands support) for inquiring for absence/presence of control command support from outside, and (4) command NOTIFY which requests to notify the outside of a condition change.

A response is returned corresponding to a command type. The responses to CONTROL command are NOT IMPLEMENTED, ACCEPTED, REJECTED and INTERIM. The responses to STATUS command are NOT IMPLEMENTED, REJECTED, IN TRANSITION and STABLE. The responses to GENERAL INQUIRY and SPECIFIC INQUIRY commands are IMPLEMENTED, and NOT IMPLEMENTED. The responses to NOTIFY command are NOT IMPLEMENTED, REJECTED, INTERIM and CHANGED.

Subunit type is provided to specify the function of the unit and allocated to each function of units, for example, tape recorder/player, tuner and the like. To determine if plural subunits of the same type exist, addressing is carried out with subunit ID as a determination number. Opcode indicates a command and operand indicates command parameter. Additional operands are fields to be added as required. Padding is also a field to be added as required. Data CRC (Cyclic Redundancy Check) is used for error check during data transmission.

FIG. 9 shows concrete examples of the AV/C command. FIG. 9A shows concrete examples of ctype/response. An upper portion of this diagram shows commands while a lower portion thereof shows responses. CONTROL is allocated to "0000", STATUS "0001", SPECIFIC INQUIRY "0010", NOTIFY "0011", GENERAL INQUIRY "0100". "0101" "0111" are reserved for future specification. Further, NOT IMPLEMENTED is allocated to "1000", ACCEPTED "1001", REJECTED "1010", IN TRANSMISSION "1011", IMPLEMENTED/STABLE "1100", CHANGED "1101" and INTERIM "1111". "1110" is reserved for future specification.

FIG. 9B shows concrete examples of subunit type. Video Monitor is allocated to "00000", Disk recorder/Player "00011", Tape recorder/Player "00100", Tuner "00101", Video Camera "00111", Vendor unique "11100" and Subunit type extended to next byte "11110". Although unit is allocated to "11111", this is used for sending directly to the unit and for example, power ON/OFF is included therein.

FIG. 9C shows concrete examples of opcode. opcode table exists for each subunit type and this indicates opcode in case where subunit type is Tape recorder/Player. Further, operand is defined for each opcode. Here, VENDOR-DEPENDENT is allocated to "00h", SEARCH MODE "50h", TIMECODE "51h", ATN "52h", OPEN MIC "60h", READ MIC "61h", WRITE MIC "62h", LOAD MEDIUM "C1h", RECORD "C2h", PLAY "C3h" and WIND "C4h".

Units connected to the bus are controlled using the AV/C command specified in this way, so that data is transmitted between units connected through the bus according to that control.

Next, as an example in which data is transmitted between units connected through the bus, an example of processing in which still image data accumulated in the digital still camera 1 is transmitted to the printer 2 through the bus 9 and printing is carried out on the printer 2 will be described. Transmission of still image data on the bus 9 is carried out on the asynchronous transmission mode.

First, the structure of a plug control register for asynchronous connection in the units 1, 2, 3 connected to the bus 9 of this embodiment will be described. A plug for each transmission mode is set up in an interface portion of a unit to be connected to the bus 9 and then, in case of a unit capable of transmission on the asynchronous transmission mode, the interface portion includes a plug control register for asynchronous connection for establishing a connection on the bus, necessary for achieving data transmission on the asynchronous transmission mode.

Figure 10:
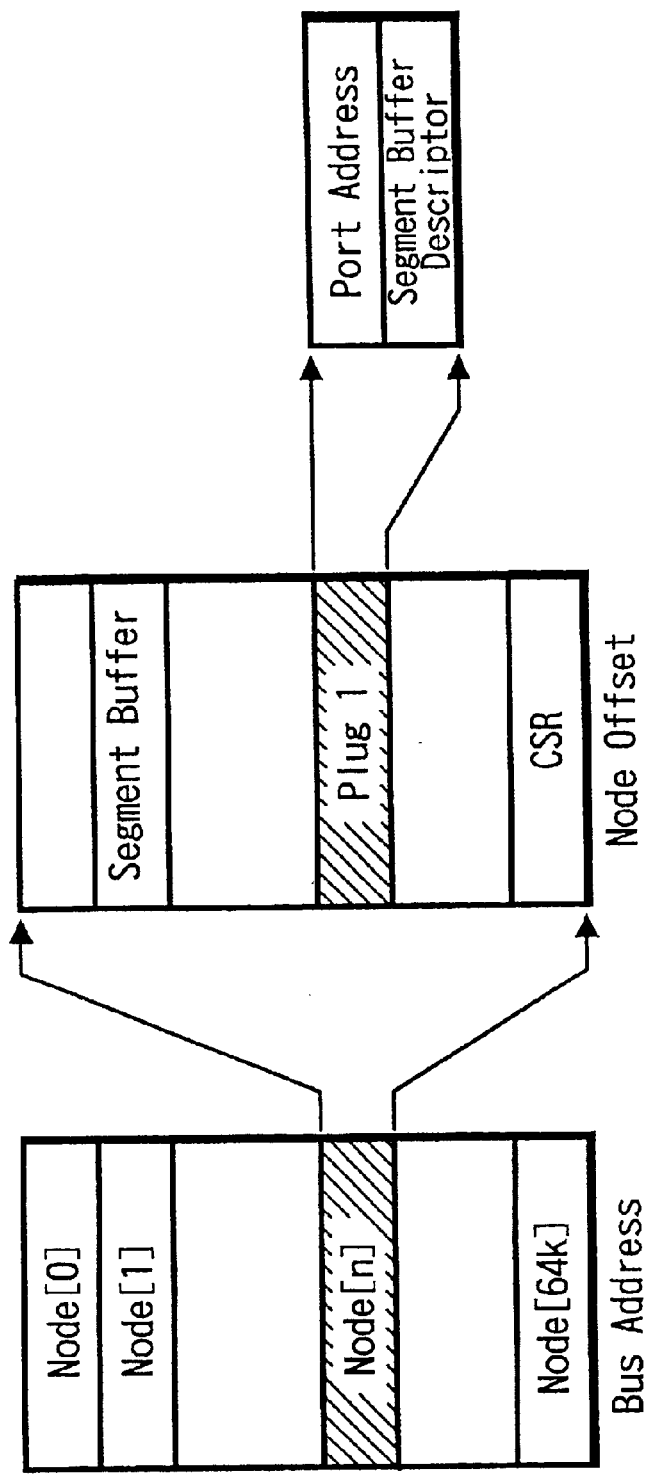
FIG. 10 is an explanatory diagram showing an example of the structure of a plug control register for asynchronous connection according to an embodiment of the present invention.

FIG. 10 is a diagram showing the structure of the plug control register for asynchronous connection. This register has hierarchical structure. As shown on the left side of FIG. 9, nodes, which are units to be connected to the bus 9, are classified as bus address data. Because 64 k units can be connected to the IEEE1394 type bus, node data having node ID in 64 k nodes max. can be stored as node offset data.

As shown in the center of FIG. 10, for node offset data of each node, an area for storing data relating to a plug for use in data transmission with that node or an area for use as a segment buffer which is a buffer for storing data transmitted in the asynchronous transmission mode and received is provided independently of each other.

As data relating to plug, as shown on the right of FIG. 10, an area for port address and an area for segment buffer descriptor are set up.

Figure 11:
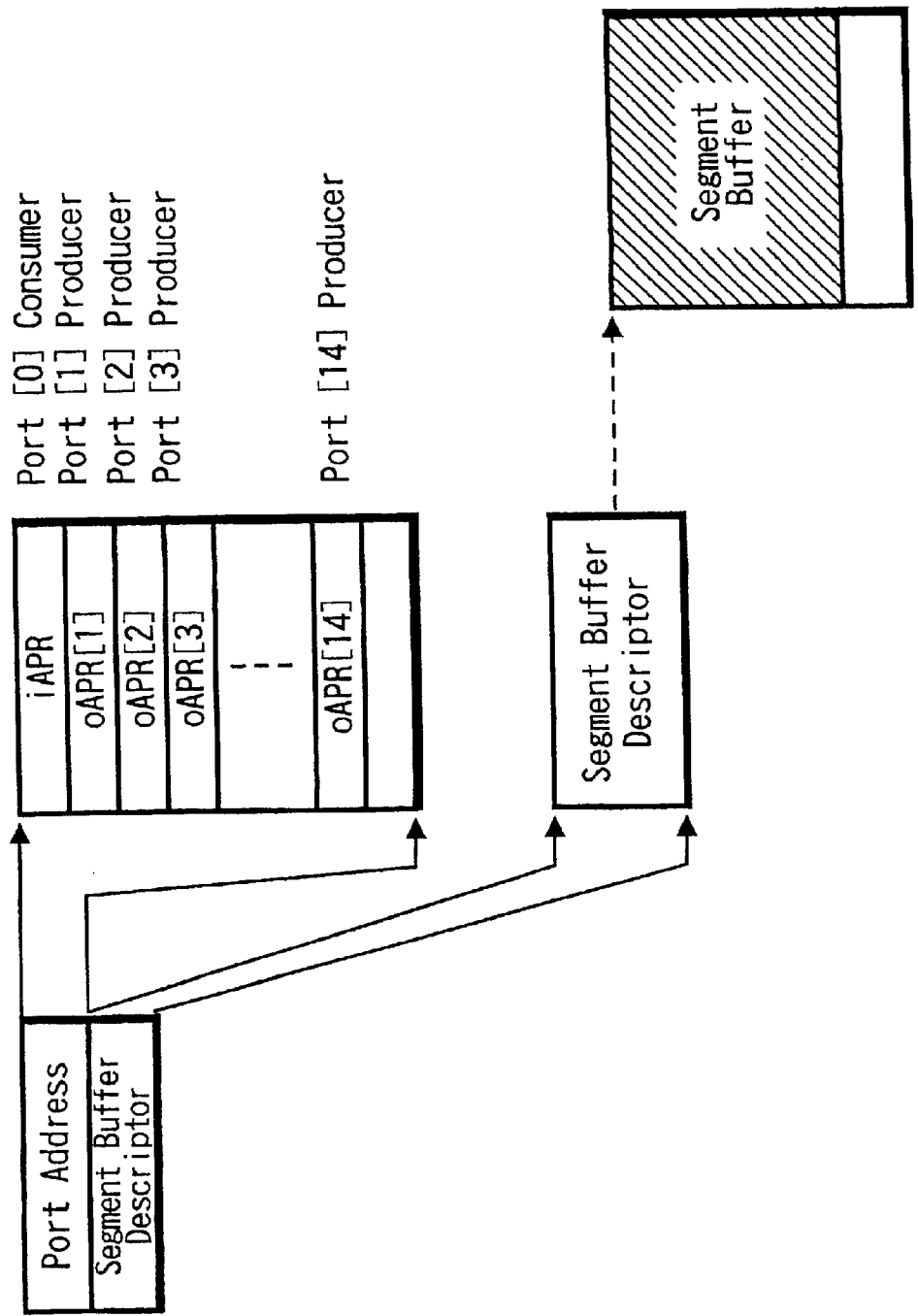
FIG. 11 is an explanatory diagram showing a relationship among port address, segment buffer descriptor and segment buffer according to an embodiment of the present invention.

As shown in FIG. 11, port address data is stored so that iAPR data which is an asynchronous input plug and oAPR which is an asynchronous output plug are memorized. The iAPR data which is the input plug is data in case where a mating unit is an input unit of a consumer and a port address is memorized in a unit. The oAPR data which is output plug is data in case where the mating unit is an output unit of producer. The oAPR data which is the output plug allows data (14 plug data from port [1]–[14] in an example of FIG. 11) from plural output plugs to be memorized at the same time for carrying out multi-cast processing in which data are inputted from plural correspondences at the same time.

If a segment buffer descriptor is employed as a consumer, data relating to the segment buffer for receiving data transmitted in asynchronous transmission mode and accumulating it temporarily is stored. As shown in FIG. 10, the segment buffer is set up at other address than each plug data area in the plug control register. As shown in FIG. 11, the position of the segment buffer for storing input data temporarily can be determined with address memorized in the segment buffer descriptor. Therefore, upon entry of data, it is used as a pointer for indicating the position of the buffer. When transmission is started in the asynchronous mode, for example, buffer address data memorized in this segment buffer descriptor is read out by a producer. Then, the producer carries out processing for writing data to be transmitted to a register at an address which performs that determination.

Figures 12, 13:
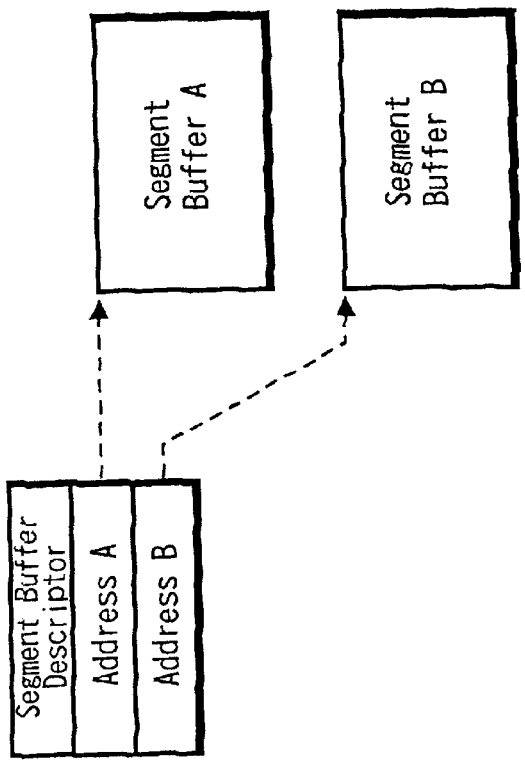
FIG. 12 is an explanatory diagram showing an example of a case where plural segment buffers are provided according to an embodiment of the present invention.
FIG. 13 is an explanatory diagram showing an example of a segment buffer descriptor according to an embodiment of the present invention.

The segment buffer may be sometimes composed of a buffer having plural memory areas. For example, if the segment buffer is composed of segment buffer A and segment buffer B as shown in FIG. 12, address of the buffer A and address of the buffer B are written into the segment buffer descriptor so as to indicate the positions of the two buffers. Which of these buffers should be used is determined depending on consideration of the producer side, for example. For example, the buffer A and the buffer B are used alternately in each segment which is unit of transmission data.

FIG. 13 is a diagram showing an example of the structure of data in the segment buffer. In this example, data of a segment buffer type supported by this unit, data of the segment buffer subtype and address data of buffer of each type are memorized.

Here, plural types of the segment buffers are prepared so that segment buffer type data is so constructed in the form of plural bit data corresponding to the number of the types, that bit of each digit corresponds to each type separately. That is, when the lowest bit is 1 data as shown in FIG. 14, it indicates that type a segment buffer is prepared. When that bit is 0 data, it indicates that the type a segment buffer is not prepared. Likewise, when the bit of next digit is 1 data, it indicates that type b segment buffer is prepared. When that bit is 0 data, it indicates that the type b segment buffer is not prepared. By using, for example, 8-bit data in this way, presence and absence of eight types of segment buffers max. are indicated. Therefore, if only a segment buffer of a type is prepared, only one digit is one data and if plural types of segment buffers are prepared, digits corresponding to the prepared number are one data. However, data of specified value like a maximum value is not used.

In case of the segment buffer sub-type data, what type of the sub-type segment buffer is prepared with what structure is indicated.

The type and sub-type of the segment buffer are generated by the capacity of the buffer, a difference in data processing using the buffer and the like. For example, a type using only a segment buffer as shown in FIG. 11 and a type using two segment buffers as shown in FIG. 12 can be considered. Further, it is permissible to prepare a buffer of different type or sub-type depending on a difference of the capacity of the segment which is the unit of transmission data. Further, it is also permissible to prepare a buffer of different type or sub-type depending on a difference in data processing such as write processing to the buffer and read processing from the buffer.

Next, data necessary for establishing connection when transmitting data from a producer (digital still camera 1) connected to the bus 9 in the system of this embodiment to consumer (printer 2) in the asynchronous transmission mode will described. First, the structure of data to be transmitted for establishing that connection will be described with reference to FIG. 15.

Figure 15:
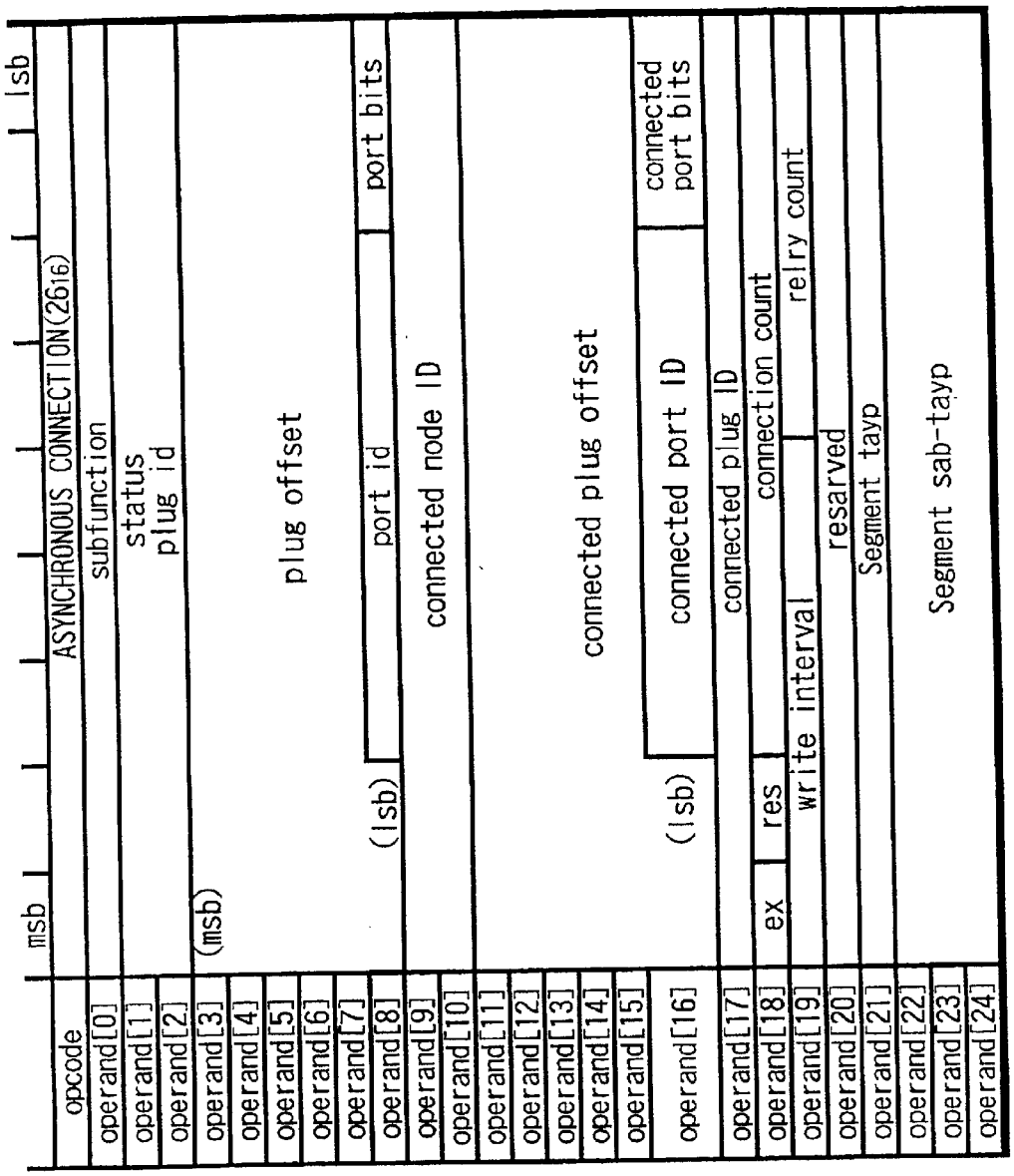
FIG. 15 is an explanatory diagram showing an example of data structure in asynchronous connection control plug according to an embodiment of the present invention.

Connection establishing data shown in FIG. 15 is to be transmitted as data for the AV/C command and disposed in a data block within a packet shown in FIG. 8. Here, asynchronous connection data is disposed in opcode interval indicating a command and sub-function data is disposed in operand[1] interval. Plug ID, plug offset, port ID, port bit, connection destination node ID, connection destination plug offset, connection destination port ID, connection destination port bit, connection destination plug ID, connection count, write-in interval, retry count and the like are disposed in order. Further, segment buffer type (operand [21] interval) data and segment sub-buffer type (operand[22]–[24] interval) data are disposed in a final interval.

The connection establishing data is transmitted between the controller and consumer and between the controller and producer so as to carry out processing for establishing a connection for asynchronous transmission mode. The controller for controlling this transmission transmits an allocate command to the consumer first to obtain its response.

FIG. 16 shows an example of data (left) about this allocate command (CONTROL command) and an example of data (right) about response (ACCEPTED response) issued by the consumer if that command is accepted by the consumer. An arrow indicating leftward on the response side of the same figure indicates that transmitted data based on command is disposed and transmitted as it is. The same thing can be said about FIG. 17 and following diagrams.

In case of this allocate command, a predetermined constant value (for example, maximum value) is disposed in plug offset area and transmitted to the consumer. In response from the consumer to the controller, an offset value (offset value from an address value for reference) at address of a plug for use as input plug of the consumer is disposed in plug offset area. The plug ID may be specified with a command from the controller or may be determined without specifying any plug. If it is not specified with any command, a plug selected by the consumer is returned as a response.

In case of the allocate command, a predetermined constant value (for example, maximum value) is disposed in segment (buffer) type area and segment (buffer) sub-type area and transmitted to the consumer. In a response from the consumer to the controller, segment (buffer) type data and segment (buffer) sub-type data written in the segment buffer descriptor of a unit are read out and disposed. Meanwhile, an example described here is an example not using the sub-type. In sub-type area for command and response, the constant value (for example, maximum value) is kept as it is and if the sub-type is used, the same processing is carried out as the type data.

After transmission of the allocate command and response to the consumer, the controller transmits allocate attach command to the producer so as to obtain response. FIG. 17 shows an example of data (left) for allocate attach command (CONTROL command) and an example of data (right) for response (ACCEPTED response) issued by the producer if that command is accepted by the producer.

In case of this allocate attach command, a predetermined constant value (for example, maximum value) is disposed in plug offset area and transmitted to the producer. In case of response from the producer to the controller, an offset value (offset value from an address value for reference) of an address of a plug used by the producer as output plug is disposed in plug offset area.

In case of the allocate attach command, plug ID data of consumer obtained from response of the allocate command is disposed in area of connection destination plug ID and consumer input plug ID is notified to the producer.

In case of the allocate attach command, segment buffer type data prepared by the consumer is disposed in an area of segment (buffer) type area. This data is segment buffer type data returned to the controller by a response of the allocate command.

When this command is received, the CPU in the producer determines which type coincides with it from segment buffer types prepared by the consumer and segment buffer types corresponding to the producer and returns the corresponding type data to the controller as a response. As for determination of the corresponding type, for example, if segment buffer type data prepared by the consumer is composed of plural bits and data of each digit is 1 data, it indicates that a type allocated to each digit is prepared. Thus, for the type corresponding to the producer, 1 data is maintained and for a type not corresponding to the producer, a corresponding digit is changed from 1 data to 0 data and returned as a response. With such processing, segment buffer type data adaptable to both the consumer and producer can be obtained.

After transmitting allocate attach command and response to the producer, the controller transmits the attach command to the consumer so as to obtain its response. FIG. 18 shows an example of data (left) for this attach command (CONTROL command) and an example of data (right) for response (ACCEPTED response) issued by the consumer if that command is accepted by the consumer.

In case of this attach command, a plug ID of consumer determined by a response to allocate is disposed. Further, plug ID data of the producer obtained by a response of the allocate attach command is disposed in a connection destination plug ID area so as to notify the consumer of producer output plug ID.

In case of the attach command, segment buffer type data adaptable to the consumer and producer, obtained by a response to allocate attach is disposed in segment (buffer) type area.

Figure 19:
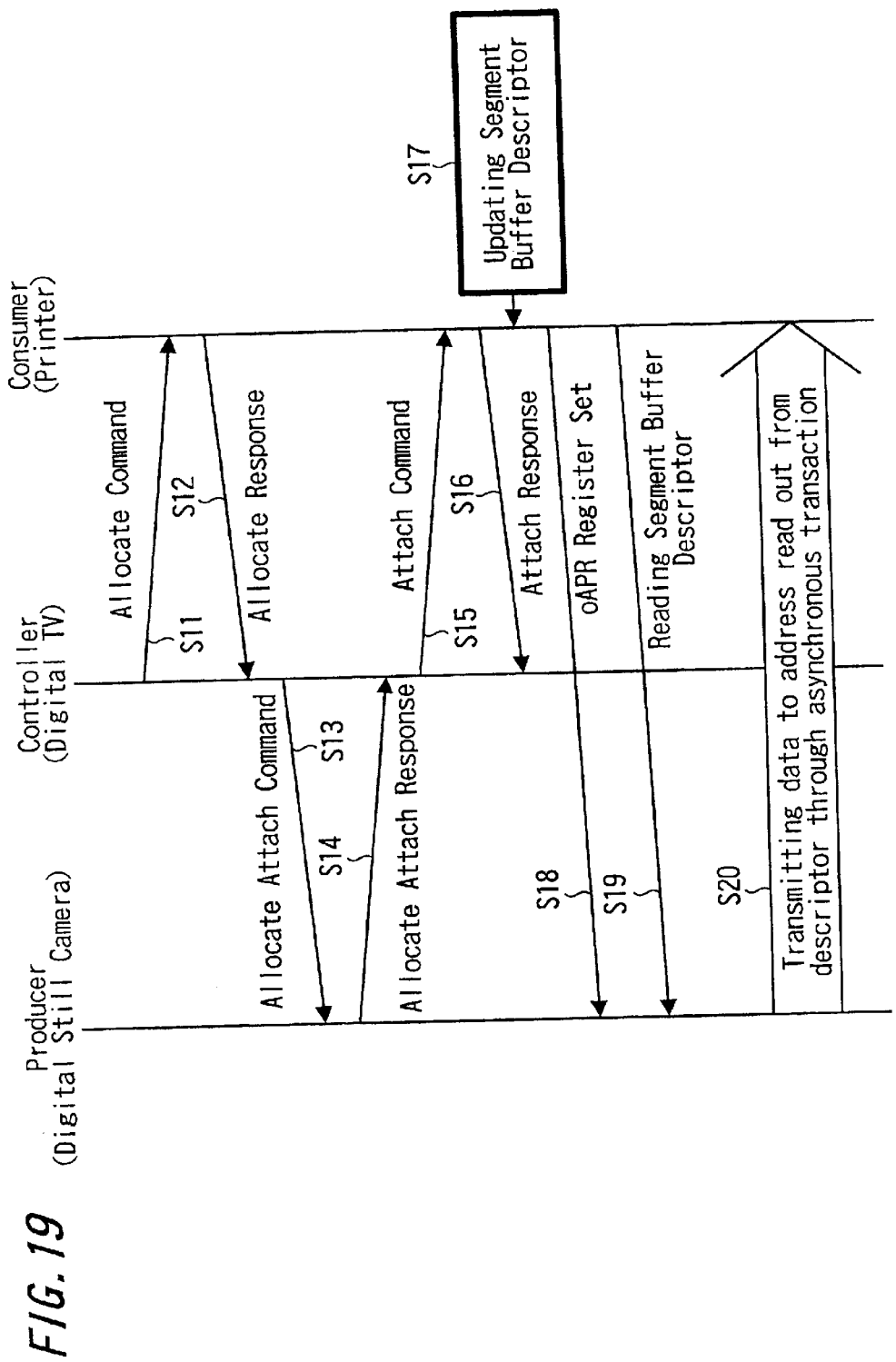
FIG. 19 is an explanatory diagram showing a command transmission condition at the time of asynchronous connection establishment according to an embodiment of the present invention.

Next, an example in which flow control data is transmitted between the producer and the consumer by a control of the controller so as to establish connection for asynchronous transmission mode and transmit data will be described with reference to FIG. 19. First, the controller (digital TV unit 3 here) transmits allocate command to the consumer (printer 2 here) (step S11) and then, its response is returned from the consumer (step S12). FIG. 16 shows data structure for this command and response. The controller sees ID of an input plug used by the consumer. Further, a buffer type and a buffer sub-type prepared by the consumer can be distinguished.

Next, the controller transmits allocate attach command to the producer (digital still camera 1 here) (step S13) and its response is returned from the producer (step S14). FIG. 17 shows the data structure for this command and response. Consumer input plug ID and buffer type and buffer sub-type prepared by the consumer are notified from the controller to the producer. Further, an output plug ID used by the producer can be distinguished by the controller and a buffer type and buffer sub-type adaptable to both the consumer and producer can be distinguished.

Next, the controller transmits the attach command to the consumer (step S15) and its response is returned from the consumer (step S16). FIG. 18 shows the data structure for this command and response. An output plug ID used by the producer is notified from the controller to the consumer. Further, a buffer type and a buffer sub-type adaptable to both the consumer and producer are notified to the consumer.

After receiving this command, the consumer updates data about segment buffer descriptor prepared in the register (step S17). Upon this update processing, the CPU selects segment buffers of buffer type and buffer sub-type to be used for this reception from buffer types and buffer sub-types adaptable to both the consumer and producer notified by the attach command. That selected segment buffer address is set in an address storage area of a segment buffer descriptor.

When a processing up to here is terminated, the consumer sets output possible in output plug oAPR register of the producer (step S18). Data for setting this output plug is transmitted directly as data specified by the IEEE1394 system asynchronous transaction (that is, not data of command type specified by the AV/C command). Further, the producer reads out an address of a segment buffer set in the segment buffer descriptor of the consumer(step S19). This address is an address set by update processing of step S17. This address read-out is carried out directly by data transmission specified by the IEEE1394 system asynchronous transaction.

After the processing up to here is terminated, the producer transmits data for each segment in asynchronous transmission mode directly to a register of an address read out from the consumer descriptor in step S19 (step S20).

If it is intended to transmit data in asynchronous transmission mode, a buffer can be selected appropriately to transmit data.

Although in the above described embodiments, a case of network constituted by the IEEE1394 system bus has been described, this may be applied to a case for data transmission between units of other network configuration. The units connected in that case are not restricted to the aforementioned video units and printers.

According to the present invention, by confirming an address set in the pointer of a register which is an output device (output unit) of producer and then transmitting data directly to a buffer at that address, it is possible to transmit data to a buffer set up in any area of an input device (input unit) of consumer. Therefore, the buffer for storing data inputted by the input device can be set up in a free area and the capacity of the buffer, data processing style and the like can be set up freely. Consequently, freedom of transmission processing is improved thereby making it possible to maintain expandability of the system.

When connecting the output plug of the output device to the input plug of the input device, a buffer type is confirmed by the output device and a type corresponding to the output device is specified in the confirmed types to the input device. An address of a buffer of the specified type is set up in a pointer. Consequently, a buffer optimum for data transmission can be set up by mutual confirmation between the output device and the input device.

Further, by confirming the buffer sub-type at the same time when the buffer type is confirmed, a further detailed transmission state can be set up.

By carrying out processing for connecting the output plug of the output device to the input plug of the input device by control of a predetermined controller connected to the network, data can be transmitted accurately to the buffer of the input device by the control of the controller.

Upon carrying out the control by this controller, the controller confirms an address of the input plug by return transmission corresponding to a first instruction sent to the input device and notifies the confirmed address of the input plug through a second instruction sent to the output device. Then, an address of the output plug of the output device is confirmed through the return transmission and the confirmed address of the output plug is notified through a third instruction sent to the input device. After the third instruction is received by the input device, the address is set up in a predetermined pointer of the input device. Consequently, after the plug address is confirmed according to each instruction from the controller, an appropriate buffer address can be set in the pointer of the input device.

After a plug address is confirmed based on each instruction from this controller, if the address is set in a predetermined pointer in the input device, the controller confirms a buffer type prepared in the input device by return transmission corresponding to the first instruction. Then, the controller notifies the confirmed buffer type to the output device through a second instruction and a type corresponding to the output device in the buffer types is notified to the controller by return transmission corresponding to the second instruction. A type corresponding to the output device is notified to the input device through a third instruction. Consequently, types adaptable to the input device and the output device can be determined, so that an appropriate buffer type can be selected.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A transmission method for transmitting data between a plurality of electronic apparatuses connected to a network in accordance with the IEEE1394 standard, wherein a data source apparatus transmits data through an output plug of the data source apparatus, across the network, and into an input plug of a data destination apparatus, comprising:

a plug connection step of connecting the output plug of the data source apparatus to the input plug of the data destination apparatus, wherein said plug connection step includes:

a buffer type confirmation step of confirming a type of a segment buffer in said data destination apparatus;

a type specification step of specifying a type corresponding to the data source apparatus from confirmed types for said data destination apparatus; and a pointer setting step of setting a segment buffer descriptor corresponding to an address of the segment buffer of the specified type in a predetermined pointer within a register in said input plug;

address confirmation step of, prior to start of transmission of said data, confirming the address of the segment buffer in said data destination apparatus for temporarily storing data obtained in the input plug by referring to the segment buffer descriptor set in the predetermined pointer; and data transmission step of transmitting data from said data source apparatus to the confirmed address of said segment buffer in said data destination apparatus through said network.

2. The transmission method according to claim 1 wherein the buffer type confirmation step includes confirmation of a sub-type.

3. The transmission method according to claim 1 wherein the plug connection step is carried out by control of a predetermined controller connected to the network.

4. The transmission method according to claim 3 comprising:

input plug address confirmation step of the controller's confirming an address of the input plug by return transmission corresponding to a first instruction transmitted to the data destination apparatus;

output plug address confirmation step of transmitting the confirmed address of the input plug through a second instruction transmitted to the data source apparatus and confirming an address of the output plug of the data source apparatus by return transmission hereof; and step of notifying of the confirmed address of the output plug through a third instruction transmitted to the data destination apparatus, and after said data destination apparatus receives said third instruction, setting the address in a second predetermined pointer within said data destination apparatus.

5. A transmission system for transmitting data between a plurality of electronic apparatuses connected to a network in accordance with the IEEE1394 standard, wherein a data source apparatus transmits data through an output plug of the data source apparatus, across the network, and into an input plug of a data destination apparatus, wherein said data destination apparatus comprises:

a segment buffer in said data destination apparatus for temporarily storing data obtained in said input plug; and an input plug register in said input plug having a pointer for storing a segment buffer descriptor of said segment buffer, and wherein said data source apparatus comprises a transmission control means for confirming an address stored in said pointer and transmitting data from said output plug to the segment buffer specified by the segment buffer descriptor.

6. The transmission system according to claim 5 wherein data about a sub-type of the segment buffer is stored in the register of the data destination apparatus.

7. The transmission system according to claim 5 further comprising a controller on the network, wherein said controller carries out processing for connecting the output plug of the data source apparatus to the input plug of the data destination apparatus.

8. The transmission system according to claim 7 wherein the controller issues a first instruction for confirming an address of the input plug for the data destination apparatus, a second instruction for transmitting the address of the input plug confirmed with said first instruction to the data source apparatus, and a third instruction for transmitting the address of the output plug confirmed with said second instruction to the data destination apparatus.

9. The transmission system according to claim 8 wherein the controller confirms a buffer type with the first instruction, transmits the confirmed buffer type to the data source apparatus with the second instruction and confirms a type corresponding to the data source apparatus in the buffer type, and transmits the type corresponding to the data source apparatus to the data destination apparatus with the third instruction.

* * * * *